Figure 1:
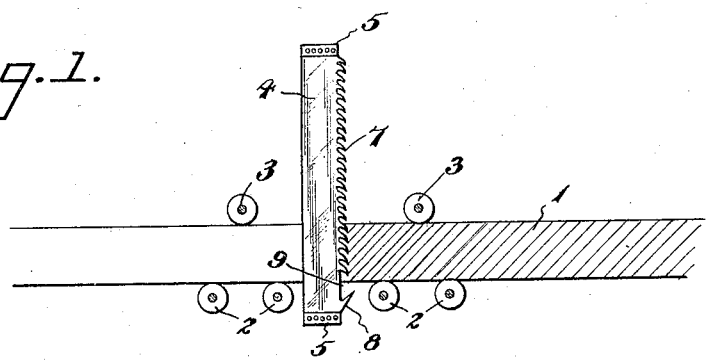

Sept. 13, 1932.  E. W. HUTCHINGS  1,876,945
SAW
Filed Oct. 15, 1931

Inventor
E. W. Hutchings
By Lacey & Lacey, Attorneys

Patented Sept. 13, 1932

1,876,945

UNITED STATES PATENT OFFICE

EDWARD W. HUTCHINGS, OF PERRY, FLORIDA, ASSIGNOR OF ONE-FOURTH TO EDWARD G. SWARTZ, ONE-FOURTH TO WILLIAM T. DAILEY AND ONE-FOURTH TO DAVID A. GROFF, ALL OF PERRY, FLORIDA

SAW

Application filed October 15, 1931. Serial No. 569,019.

This invention relates to saw blades employed in oscillatory reciprocating sash gang saws and the object of the invention is to provide means whereby the kerf produced in the work will be cleared and the formation of strings at the edges of the kerf will be avoided. The invention is illustrated in the accompanying drawing and will be hereinafter first fully described and then more particularly defined in the appended claim.

Figure 2:
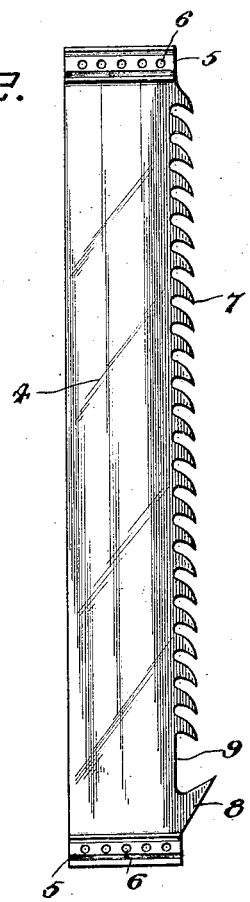
Figure 3:
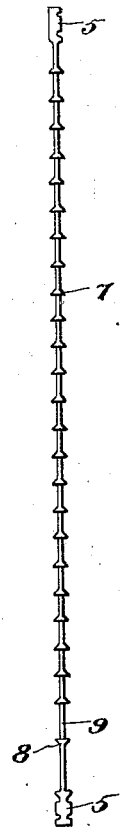

In the drawing,

Figure 1 is an elevation of a sash gang saw blade embodying the invention showing its relation to the work, Fig. 2 is an enlarged detail elevation of the blade, Fig. 3 is an edge view of the blade.

The lumber, indicated at 1, is fed to the saw in the usual manner, being supported by feed rolls 2, at the front and back of the blade, and being held to the feed rolls by pressure rolls 3 which engage the upper side of the lumber, as shown in Fig. 1. The saw blade comprises a metal strip or plate 4 provided at its ends with enlarged heads 5 having openings 6 therethrough to be secured in the saw-carrying frame in the usual manner. The cutting edge of the saw is provided with a series of teeth 7 of hook form which extend nearly the full length of the blade and all of said teeth are tapered or pointed downwardly in the same direction so that they will cut through the lumber on the down stroke. At the lower end of the blade, there is a tooth 8 which is reversed relative to the other teeth 7 and is spaced from the series of teeth 7, as shown at 9. The tooth 8 projects from the edge of the saw blade a greater distance than the teeth 7 and the difference in the size of the teeth and the spacing of the same may be determined by the work to which the blade is to be subjected, it being understood that the blades will be provided in various sizes and the operator may place in the machine that blade best adapted for the particular work in hand. It will be noted, upon reference to Fig. 2, that the clearing or reversed tooth 8 has a sharp point or terminal, the upper edge of the tooth being very perceptibly inclined upwardly from a horizontal plane while the lower edge approaches a vertical plane touching the bases of all the teeth, the resulting formation being a sharp upstanding tooth which will readily enter and cut through the lumber without tearing it.

On the down stroke of the blade, the teeth 7 will cut through the lumber in the usual manner and will form a kerf or groove which action will be repeated on each successive down stroke so that, eventually, the entire length of the lumber will be cut through and the lumber will be divided into strips of the width for which the saw is set. On the up stroke, the reversed tooth 8 cuts a groove which serves as a track or guide for the down stroke of the saw. In other words, the reversed tooth 8 cuts the groove a little in advance of the regular down stroke of the saw and prevents what is known as strings or splinters on the sawed lumber. At the start of the down stroke, the saw will be oscillated so that the tooth 8 will be shifted from the base of the kerf and the corner of the innner wall of the kerf will be presented in the space 9 of the blade and the teeth 7 will be set to cut through the lumber on the ensuing stroke. Interference of the clearing tooth 8 with the action of the cutting teeth 7 will thus be avoided by the oscillation of the gang of saw blades. If the first stroke of the saw is the upstroke, the bottom reversed tooth will form a shallow kerf to guide the upper teeth on their down cutting stroke.

The device is exceedingly simple and inexpensive and has been proven to be highly efficient in actual use. The ordinary saw blade which cuts in only one direction forms strings of splinters along the edge of the slot or division formed through the work, especially if the lumber is not fully dried, and the presence of these strings or splinters detracts from the appearance and value of the finished product. By the use of the present device, however, the splinters or strings, which have ordinarily been produced, have been eliminated even when working with lumber which has not been fully dried. By reference to Fig. 2 of the drawing, it will be seen that the walls of the blade at opposite ends of the space 9 are undercut while the clearing tooth 8 is substantially twice the length of the cutting teeth and overhangs the adjacent undercut wall so as to afford ample clearance. It will also be noted that the distance between the point of the clearing tooth 8 and the point of the adjacent cutting tooth is greater than the distance between the points of any two of said cutting teeth. Furthermore, the lower edge of the clearing tooth has a greater inclination towards the horizontal axis of the blade than the upper edge of said tooth thereby to prevent said clearing tooth from detaching slivers of wood from the work on the downward stroke of the saw therethrough. The space 9 between the clearing tooth 8 and the cutting teeth 7 is longer than the travel of the feed finger on the saw-grinding machine, thereby voiding reversal of the direction of the saw by the feed finger after the last cutting tooth is ground.

Having thus described the invention, I claim:

A sash gang saw comprising a blade having means at its opposite ends for attachment to a saw-carrying frame and provided along one edge between said attaching means with a series of downwardly projecting cutting teeth of hook form terminating short of the lower end of the blade and all extending in the same direction, and a pointed clearing tooth disposed at the lower end of the blade and spaced from and reversed relative to the cutting teeth, the walls of the blade at the opposite ends of the space between the cutting teeth and clearing tooth being undercut and the distance between the point of the clearing tooth and the point of the adjacent cutting tooth being greater than the distance between the points of any two of the cutting teeth, said clearing tooth being substantially twice the length of the cutting teeth and the pointed end thereof overhanging the adjacent undercut wall at the space between the clearing tooth and cutting teeth and projecting laterally in a straight line beyond the ends of said cutting teeth, the lower edge of the clearing tooth extending from the point thereof towards the adjacent frame attaching means and having a greater inclination towards the horizontal axis of the blade than the upper edge thereof whereby to prevent the clearing tooth from detaching slivers of wood from the work on the downward stroke of the saw therethrough.

In testimony whereof I affix my signature.

EDWARD W. HUTCHINGS.